(12) United States Patent
Wallstedt et al.

(10) Patent No.: US 6,748,214 B1
(45) Date of Patent: *Jun. 8, 2004

(54) ROBUST MANUAL SEARCH FOR AUTONOMOUS PRIVATE SYSTEMS

(75) Inventors: Yngve Kenneth Wallstedt, Chapel Hill, NC (US); Olof Tomas Backstrom, Cary, NC (US); Mats Vilhelm Hoglund, Cary, NC (US)

(73) Assignee: Ericsson, Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/368,327

(22) Filed: Aug. 3, 1999

(51) Int. Cl.[7] ................................................. H04Q 7/20
(52) U.S. Cl. ........................ 455/434; 455/435; 455/412
(58) Field of Search ................................ 455/434, 414, 455/412, 435, 515, 516, 403, 575, 550, 426, 552, 553, 418, 462, 458, 500, 509, 168.1, 161.1, 150.1, 180.1, 188.1, 513, 437, 466, 422; 370/337; 379/58, 59, 61

(56) References Cited

U.S. PATENT DOCUMENTS

| | | | | |
|---|---|---|---|---|
| 5,442,806 A | * | 8/1995 | Barber et al. ............... | 455/33.1 |
| 5,504,803 A | * | 4/1996 | Yamada et al. ............... | 379/59 |
| 5,590,397 A | * | 12/1996 | Kojima ....................... | 455/33.1 |
| 5,613,204 A | * | 3/1997 | Haberman et al. .......... | 455/33.2 |
| 5,734,980 A | * | 3/1998 | Hooper et al. ............... | 455/434 |
| 5,903,832 A | * | 5/1999 | Seppanen et al. ........... | 455/414 |
| 5,915,219 A | * | 6/1999 | Poyhonen .................... | 455/435 |
| 5,920,821 A | * | 7/1999 | Seazholtz et al. ........... | 455/466 |
| 5,995,834 A | * | 11/1999 | Moore ......................... | 455/434 |
| 6,229,996 B1 | * | 5/2001 | Uistola ..................... | 455/168.1 |
| 6,418,313 B1 | * | 7/2002 | Wallstedt .................... | 455/434 |

* cited by examiner

Primary Examiner—Edward F. Urban
Assistant Examiner—C. Chow
(74) Attorney, Agent, or Firm—Moore & Van Allen PLLC; Gregory A. Stephens

(57) ABSTRACT

A mobile station can be used in both public cellular systems and private cellular systems, the private cellular system using select allocated frequency bands from the public cellular systems. There is disclosed herein a system for manually searching for one of the private cellular systems. The system comprises a memory storing information on select frequency bands. A transmitter and receiver is provided for communicating in the public cellular systems and the private cellular systems. An input initiates a manual search for one of the private cellular systems using the stored information on one of the select frequency bands. A programmed processor is operatively coupled to the memory, the transmitter and receiver and the input for operating the transmitter and receiver to search for the one private cellular system using the one of the select frequency bands.

10 Claims, 4 Drawing Sheets

ROBUST MANUAL SEARCH FOR AUTONOMOUS PRIVATE SYSTEMS

FIELD OF THE INVENTION

This invention relates to autonomous private cellular systems operating in public cellular system frequency bands and, more particularly, to a system and method for manually searching for autonomous private systems.

BACKGROUND OF THE INVENTION

A wireless communication system, in the form of a cellular system, is designed to cover a large geographic area. The system is divided into numerous cells providing air interface between mobile stations and land-based systems. Each cell includes a base station for communicating with mobile stations. These wireless communication systems maintain a set of frequencies that are used for traffic channels and control channels. Frequency planning is necessary in order to determine which of the frequencies should be used at any given time.

Recently, cellular-based system design is used as a foundation for smaller systems, such as private cellular or wireless office systems. These private cellular systems may share the frequency spectrum with the public cellular systems. The private cellular system user must be defined as a normal cellular subscriber in the subscriber database of the public cellular system, and the user's mobile station must be defined in both the private cellular system and the public cellular system. These are preconditions to enable the mobile station to roam between the public and private cellular system and to perform authentication. It will also be required for the mobile station to find the private cellular system. Use of neighbor cell pointers from the public system to the private system is not desirable, since it will increase the administration of the public system. Instead, a mechanism based on stored information in the terminal is preferred. Such a mechanism is defined in ANSI-136.

A frequency re-plan is usually performed to give more capacity or to improve coverage. Since the public cellular systems have a limited spectrum based on the licensed frequency band, capacity is increased by increasing the number of frequencies in each cell site and/or installing more cell sites. Both methods bring new frequencies in use in the area affected. Since frequencies are re-used, other cell sites frequency use is also affected and they may have to re-tune their transceivers to other frequencies to accommodate the first change. This produces a rippling effect. The private cellular systems monitor the public cellular system and avoid frequencies used nearby in the public cellular systems. A change in the public cellular system's frequency use thus changes the frequency use of the private cellular systems.

A mobile station will not automatically find an autonomous private cellular system if a frequency re-plan of the control frequency has taken place in either the private or public cellular systems. Also, the first time a mobile station wants to acquire service from a private cellular system, the appropriate parameters, such as the public service profile/private operating frequency (PSP/POF) parameters in the ANSI 136, Rev. A standard are not defined in the mobile station and it will not automatically find the private cellular system.

If the mobile station cannot automatically find the private cellular system, due to, e.g., the stored PSP/POF information is not correct due to a frequency re-plan, then a manual search must be invoked. Presently, the ANSI-136 Rev. A standard outlines a manual search procedure to find a private cellular system. However, the search is limited to the frequency band the mobile station is presently camping on. As a result, autonomous private cellular systems operating on other bands cannot be found. In a publication entitled "Global Operators Forum *Implementation Guide: Non-Public Mode Operation in TIA/EIA-136-A Compliant Mobile Stations*", Version 4, December 1998, a modified manual search is proposed. In this proposal, the mobile station searches all bands if the private system is not found in the frequency band the mobile station was last camping on. Searching all bands can take more than fifteen minutes, resulting in substantial inconvenience for the end user. A mobile station designed according to ANSI-136 Rev. A can also be configured to find a private cellular system during a power-up scan. However, doing so limits the usage of the intelligent roaming database (IRDB) for public cellular system and provides undesirable behavior, such as long scanning times whenever a power-on is performed in the public cellular system and limited roaming capabilities.

The present invention is directed to solving one or more of the problems discussed above in a novel and simple manner.

SUMMARY OF THE INVENTION

In accordance with the invention there is provided a unique and more robust manually initiated search procedure for private cellular systems in a mobile station, independent of the frequency band the mobile station was last camping on.

Broadly, there is disclosed herein in a mobile station for use in both public cellular systems and private cellular systems, the private cellular system using select allocated frequency bands from the public cellular systems, a system for manually searching for one of the private cellular systems. The system comprises a memory storing information on select frequency bands. A transmitter and receiver is provided for communicating in the public cellular systems and the private cellular systems. An input initiates a manual search for one of the private cellular systems using the stored information on one of the select frequency bands. A programmed processor is operatively coupled to the memory, the transmitter and receiver and the input for operating the transmitter and receiver to search for the one private cellular system using the one of the select frequency bands.

It is a feature of the invention that the memory stores a directory of the private cellular systems including identification information and a frequency band for each private cellular system. The input selects from the directory of private systems and the programmed processor operates the transmitter and receiver to search for the one of the private cellular systems on the stored frequency band for the selected private cellular system. It is another feature of the invention that the input can be used to update the directory.

It is another feature of the invention that the memory stores plural predefined frequency bands. The input selects from the plural predefined frequency bands and the programmed processor operates the transmitter and receiver to search for the one of the private cellular systems on the selected predefined frequency band for one of the private cellular systems.

It is another feature of the invention that the programmed processor is operated to initially search using strongest control channels found in the selected predefined frequency band.

There is disclosed in accordance with another aspect of the invention the method of operating a mobile station used in both public cellular systems and private cellular systems, the private cellular systems using select allocated frequency bands from the public cellular systems, for manually searching for a private cellular system. The method comprises the steps of storing information on select frequency bands; initiating a manual search for one of the private cellular systems using the stored information on one of the select frequency bands; and operating a transmitter and receiver communicating in the public cellular systems and the private cellular systems to search for the one private cellular system using the one of the select frequency bands.

Further features and advantages of the invention will be readily apparent from the specification and from the drawings.

DETAILED DESCRIPTION OF THE INVENTION

Figure 1:
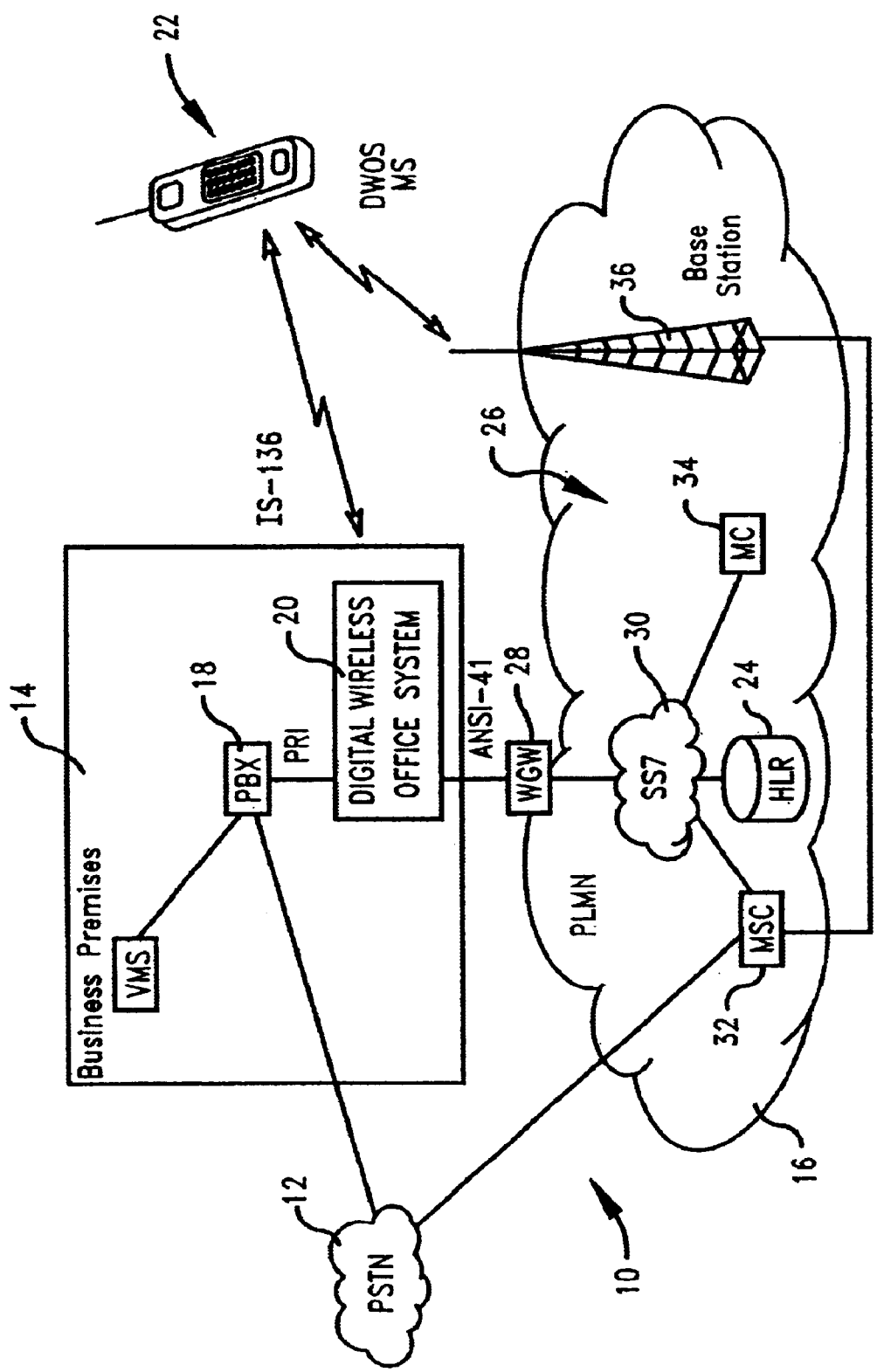
FIG. 1 is a generalized block diagram illustrating a mobile station communicating in both a public cellular system and a private cellular system.

Referring initially to FIG. 1, a telephone communication system 10 is generally illustrated. The communication system 10 consists generally of the public switched telephone network (PSTN) 12 shown connected to a private business premises 14 and the public land mobile network 16. The business premises 14 includes a private branch exchange (PBX) 18 for communicating with the PSTN 12 in the conventional manner. A digital wireless office system (DWOS) 20 is a fully digital mobile communication system that provides a mobile extension to the PBX 18. The DWOS 20 allows use of digital cellular phones based on cellular or PCS standard within an office environment. It operates on either one of the cellular bands (850 MHz) or one of the personal communication services (PCS) bands (1900 MHz).

While the ANSI-136 standard is used as an exemplary embodiment in this application, the invention as described herein is applicable to all cellular standards where support for autonomous private cellular systems is provided.

The DWOS 20 is a private cellular system that coexists with a public cellular system 26 in the PLMN 16 and uses the frequencies that are licensed to the operator of the particular network. The DWOS 20 automatically finds usable frequencies.

A digital wireless office system mobile station 22 is adapted for communication both with the DWOS 20 and the public cellular system 26. The mobile station 22 must be defined in both the DWOS 20 and the public cellular system 26. The DWOS 20 interacts with a home location register (HLR) 24 using the ANSI-41 protocol. A WOS SS7 gateway (WGW) 28 is used for interworking between SS7 and TCP/IP if TCP/IP is not used by the HLR 24 for communicating via an SS7 network 30. Other elements of the PLMN 16 connected to the SS7 network are a conventional mobile switching center (MSC) 32 which is connected to the PSTN 12, and a message center 34. The MSC 32 is in turn connected to a base station 36 that communicates with the mobile station 22 in the conventional manner for public cellular systems.

The DWOS mobile station 22 is reached either through its PLMN telephone number or a DWOS user number. The general communication principles involving the mobile station 22 and the DWOS 20 and PLMN 16 are known and are not specifically described herein. The present invention relates particularly to the system and method for conducting a robust manual search for an autonomous private cellular system, such as the DWOS 20. Such a search might be necessary if a frequency re-plan of control frequencies has taken place in either the private or public cellular systems, or the first time the mobile station 22 wants to acquire service from the DWOS 20. This search is independent of the system the mobile station 22 was last camping on.

Figure 2:
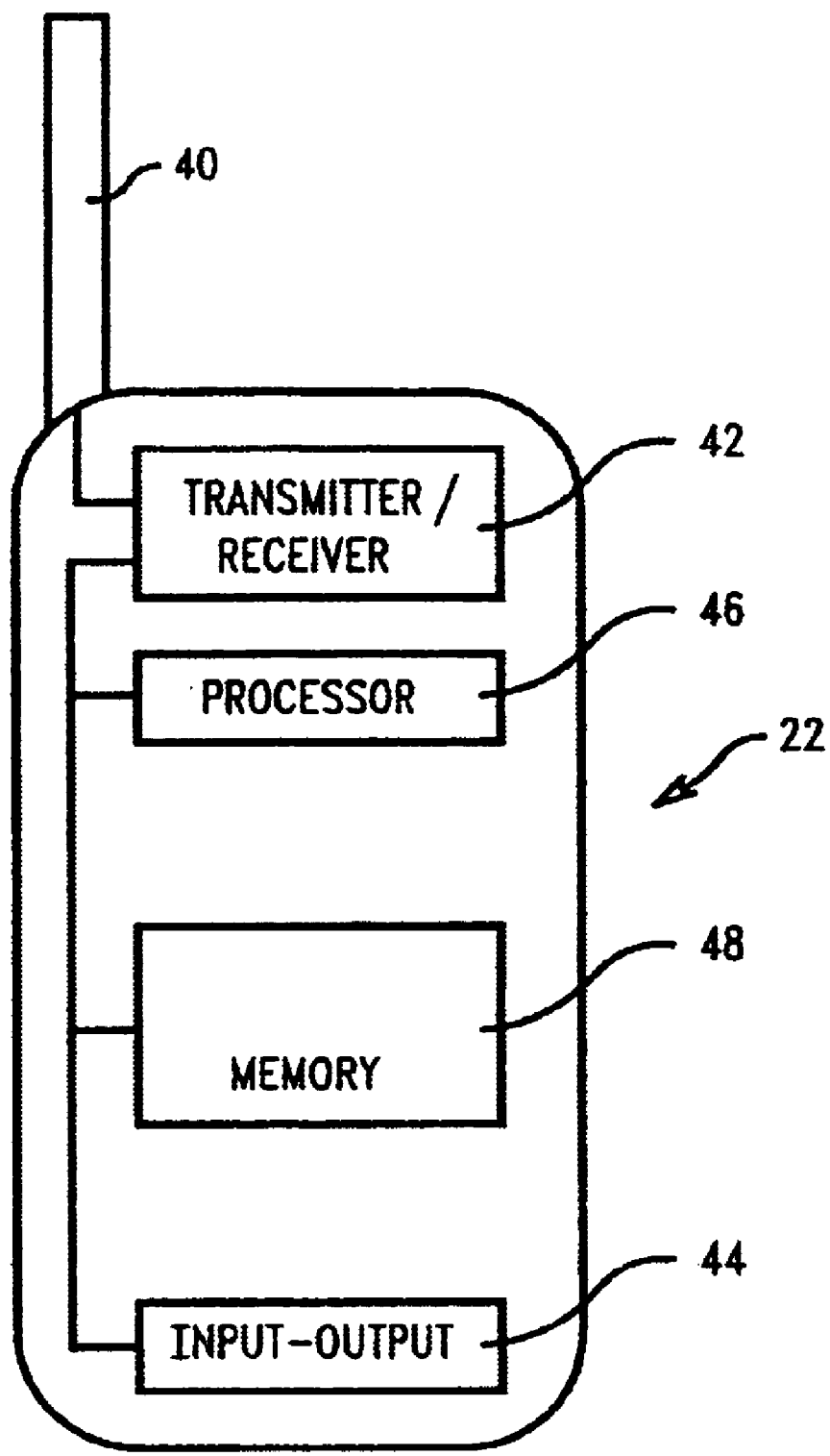
FIG. 2 is a block diagram of the mobile station of FIG. 1.

Referring to FIG. 2, the mobile station 22 is illustrated in block diagram form. The mobile station 22 includes an antenna 40 for sending and receiving radio signals between itself and the communication system 10 see FIG. 1. The antenna is connected to a transmitter receiver 42 to broadcast and receive on the same antenna 40. particularly the transmitter/receiver 42 includes a receiver that demodulates. demultiplexes, and decodes the radio signals into one or more channels. Such channels include a control channel and a traffic channel for speech or data. The speech or data are delivered to an output device of an input-output circuit 44, such as speaker. The receiver delivers messages from the control channel to a processor 46. The processor 46 controls and coordinates the functioning of the mobile station 22 responsive to messages on the control channel using programs and data stored in a memory 48, so that the mobile station 22 can operate within the wireless network. The processor 46 also controls the operation of the mobile station 22 responsive to input from the input-output circuit 44. This input may utilize a keypad or the like as a user-input device and a display to give the user information, as is well known. The transmitter/receiver 42 also includes a transmitter that converts analog electrical signals into digital data, encodes the data with error detection and correction information and multiplexes this data with control messages from the processor 46. This combined data is modulated and broadcast via radio signal through the antenna 40, as is conventional.

The memory 48, in accordance with the invention, stores a record or directory of private cellular systems. This directory includes an alphanumeric system name, system identity, such as PSID and SID in the ANSI-136 standard, and frequency band and hyperband for each such private cellular system. This record could be an extension of the record in IS-136 mobile stations used for automatic searching. The end user is able to edit the information in the record and to add information regarding new private systems using the input-output circuit 44, see FIG. 2.

Figure 3:
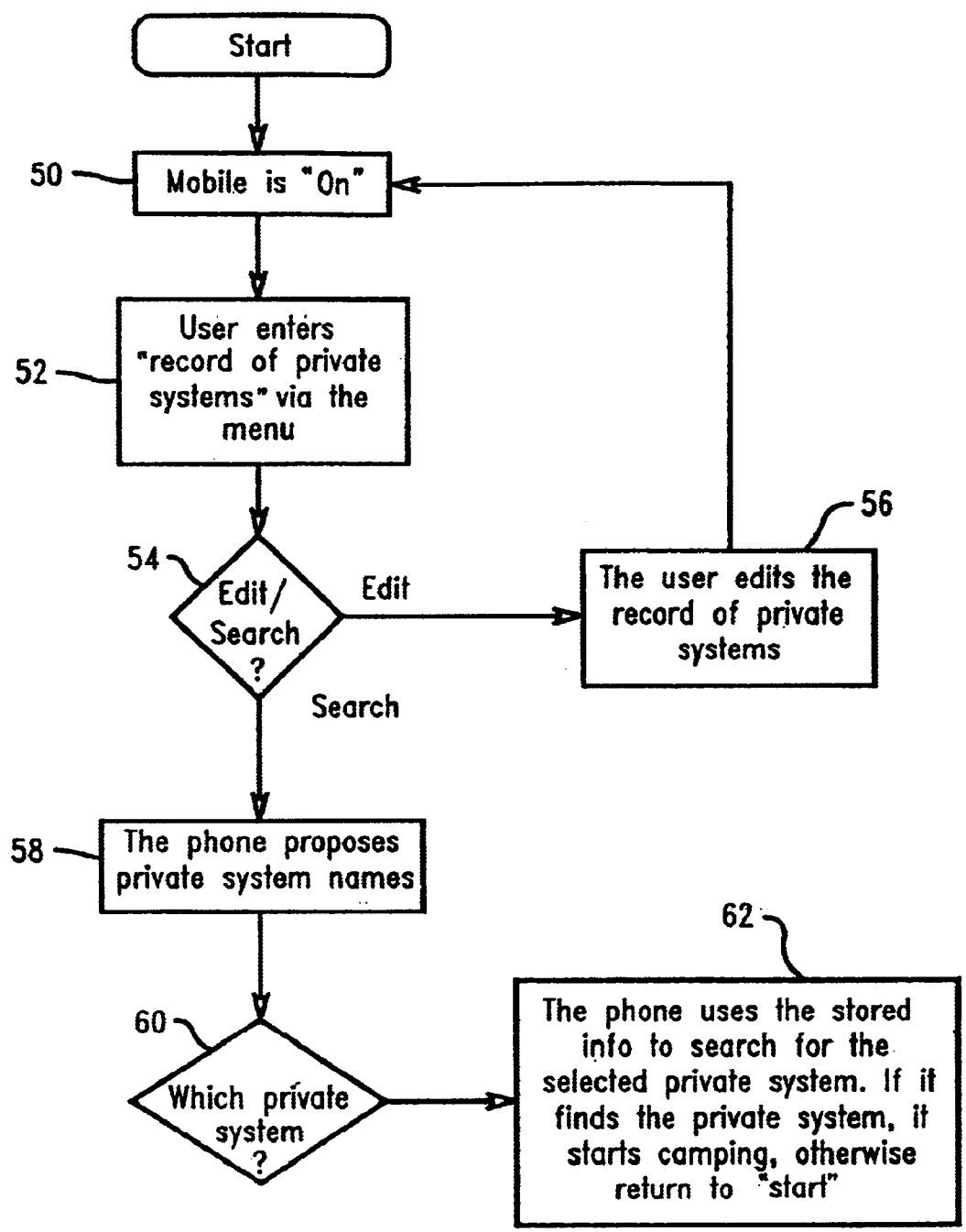
FIG. 3 is a flow diagram illustrating a manually initiated search procedure in accordance with one aspect of the invention.

With reference to FIG. 3, a flow diagram illustrates a program for implementing a system name initiated manual search in accordance with the invention. At a block 50, the mobile station 22 is on. However, the mobile station need not be camping on any particular cellular system. If the user wishes to initiate a manual system name search, then the user enters the directory or record of private cellular systems via an appropriate menu at a block 52. A decision block 54 determines whether the user has requested to perform a manual search for a private cellular system or to edit the record. If the user selects the edit function, then at a block 56 the user edits the record of private systems. For each existing or new private system, the user must enter an alphanumeric name, the PSID, SID, and frequency band. The control then returns to the block 50.

If the user wishes to conduct a manual search from the block 54, then at a block 58 the mobile station lists the available private cellular system names. A decision block 60 waits for the user to select one of the private cellular system names and then advances to a block 62. The mobile station 22 uses the stored information for the selected private cellular system to attempt to obtain service via the transmitter-receiver 42, see FIG. 2, on the selected system. If the mobile station 22 finds the private cellular system, then it starts camping on that private cellular system. Otherwise, the program returns to the start node.

In addition to the system name initiated manual search, the mobile station 22 in accordance with the invention utilizes a band initiated search. This search is illustrated in the flow diagram of FIG. 4. From a start node, a user selects a band initiated search via a menu at a block 70. With the band initiated search, the end user specifies the band to search by choosing one band from a set of predefined bands, such as a, b, A, B, C, D, E, F in IS-136. A decision block 72 displays the available bands. The user then selects from these bands and at a block 74 the mobile station 22 searches all frequencies where a system can be found within the specified band. Conventionally, the mobile station 22 searches the whole band. The procedure can be accelerated by looking only at the two strongest control channels found in a sub-band. The mobile station then evaluates the rest of the band if a private cellular system is not found by the accelerated procedures. Two types of searches may be implemented using the band initiated search procedure. The first is a search for a private system identified by its PSID and SID and/or SOC. The second is a search for new private systems that accept a test registration in ANSI-136. If a band initiated search is initiated, or if no PSID, SID or SOC is defined for a system name initiated search, then a search procedure for new private systems is used.

Figure 5:
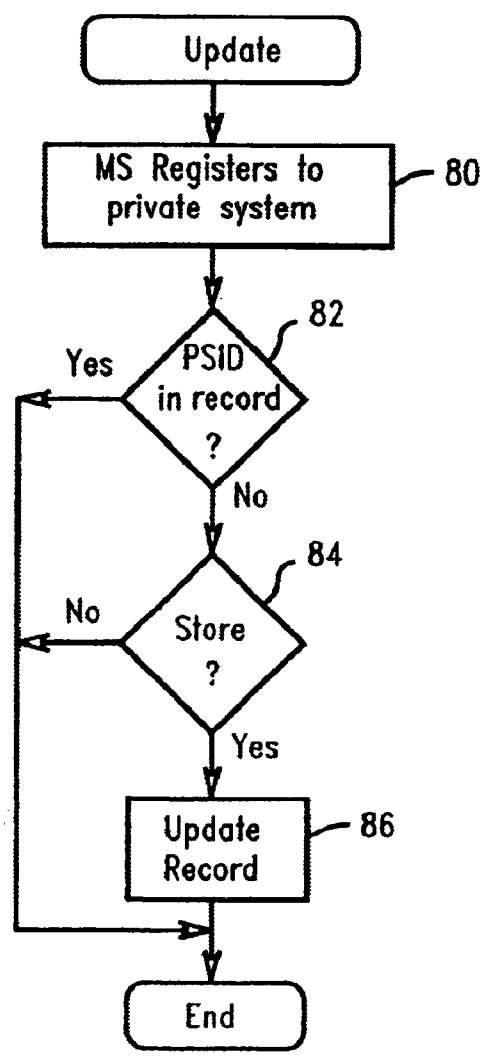
FIG. 5 is a flow diagram illustrating updating of private cellular system information in a mobile station in accordance with the invention.

Referring to FIG. 5, a flow diagram illustrates a procedure for updating a private cellular system record at registration. This update procedure begins at a block 80 when the mobile station 22 has successfully registered on a private cellular system. This may be done, for example, after a new system search, and if the PSID is not in the phone's private cellular system record. Particularly, a decision block 82 determines if the PSID is in the record. If so, then the routine ends. If not, then at a decision block 84 the phone asks the user if the private cellular system should be stored in the record. If not, then the routine ends. If so, then the record is updated at a block 86 by storing the alphanumeric name, PSID, SID and frequency band in the private system record. This routine then ends.

Figure 4:
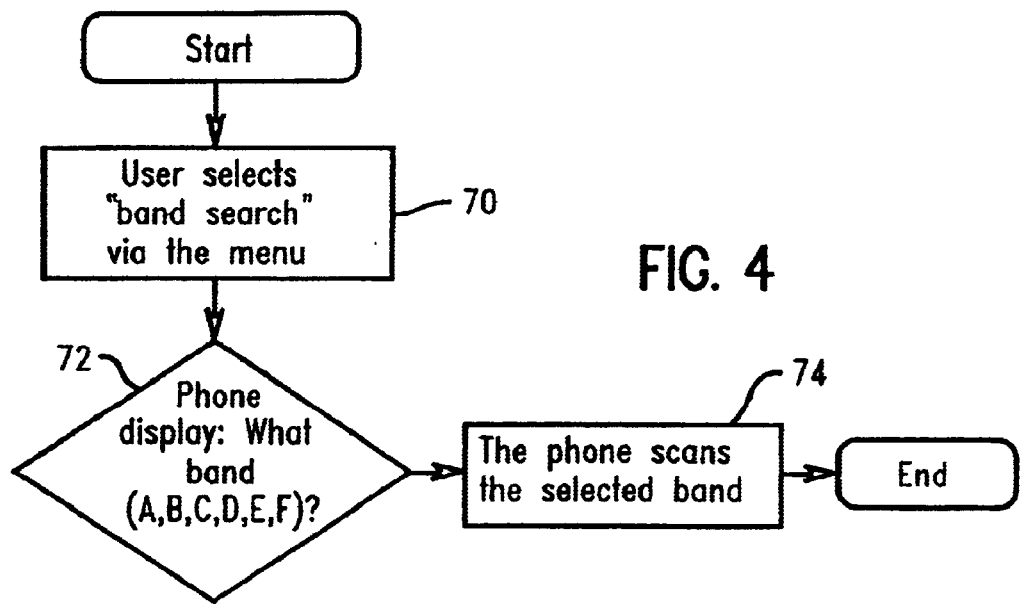
FIG. 4 is a flow diagram illustrating operation of a manually initiated search procedure in accordance with another aspect of the invention.

Thus, in accordance with the invention, the memory 48 stores information on both the select frequency bands available in the system and the record of private systems. This information can be used to manually search for a private cellular system using a system name initiated search, as illustrated relative to FIG. 3, or a frequency band initiated search, as illustrated in FIG. 4.

We claim:

1. In a mobile station for use in both public cellular systems and private cellular systems, the private cellular systems using select allocated frequency bands from the public cellular systems, a system for manually searching for a specific private cellular system comprising:

a memory storing a directory of private cellular systems, including identification information for each private cellular system and a frequency band associated with each private cellular system;

a transmitter and receiver for communicating in the public cellular systems and the private cellular systems;

an input for initiating a manual search for a specific private cellular system, the input selecting from the directory of private cellular systems; and a programmed processor operatively coupled with the memory, the transmitter and receiver, and the input, said programmed processor for operating the transmitter and receiver to search for the selected private cellular system on the frequency band associated with the selected private cellular system.

2. The system of claim 1 wherein the input is used to update the directory.

3. The system of claim 1 wherein the memory stores plural predefined frequency bands.

4. The system of claim 3 wherein the input selects from the plural predefined frequency bands and the programmed processor operates the transmitter and receiver to search for the one of the private cellular systems on the selected predefined frequency band for one of the private cellular systems.

5. The system of claim 4 wherein the programmed processor is operated to initially search using strongest control channels found in the selected predefined frequency band.

6. In a mobile station used in both public cellular systems and private cellular systems, the private cellular systems using allocated frequency bands from the public cellular systems, a method of manually searching for a private cellular system, comprising the steps of storing a directory of private cellular systems, including identification information for each private cellular system and a frequency band associated with each private cellular system;

selecting from the directory of private cellular systems one of the private cellular systems; and operating a transmitter and receiver communicating in the public cellular systems and the private cellular systems to search for the selected private cellular system on the frequency band associated with the private cellular system.

7. The method of claim 1 further comprising the step of updating the directory.

8. The method of claim 6 wherein the storing step comprises storing plural predefined frequency bands.

9. The method of claim 8 wherein the initiating step comprises selecting from the plural predefined frequency bands and the transmitter and receiver are operated to search for the one of the private cellular systems on the selected predefined frequency band for one of the private cellular systems.

10. The method of claim 9 wherein the transmitter and receiver are operated to initially search using strongest control channels found in the selected predefined frequency band.

* * * * *